US012597961B2

(12) United States Patent
Ballantyne et al.

(10) Patent No.: US 12,597,961 B2
(45) Date of Patent: Apr. 7, 2026

(54) CIRCUIT REDUNDANCY AND WEAR BALANCING TO IMPROVE CIRCUIT LIFETIME

(71) Applicant: Intel Corporation, Santa Clara, CA (US)

(72) Inventors: Wayne Ballantyne, Chandler, AZ (US); Benjamin Jann, Portland, OR (US); Marco Bresciani, Villach (AT); Wei Chen, Fremont, CA (US); Chien-Hwa Tou, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 17/549,409

(22) Filed: Dec. 13, 2021

(65) Prior Publication Data

US 2023/0188178 A1 Jun. 15, 2023

(51) Int. Cl.
| | |
|---|---|
| *H04B 1/74* | (2006.01) |
| *G05F 1/46* | (2006.01) |
| *H04B 1/40* | (2015.01) |
| *H04W 88/02* | (2009.01) |

(52) U.S. Cl.
CPC ................. *H04B 1/74* (2013.01); *G05F 1/46* (2013.01); *H04B 1/40* (2013.01); *H04W 88/02* (2013.01)

(58) Field of Classification Search
CPC ................ H04B 10/40; H04B 10/0799; H04B 2210/08; H04B 10/07; H04B 10/6911; H04B 10/03; H04B 10/43; H04B 1/40; H04B 10/0795; H04B 10/07955; H04B 10/1149; H04B 10/50; H04B 1/56; H04B 1/74; H04B 10/00; H04B 10/0775; H04B 10/0791; H04B 10/0793; H04B 10/503; H04B 10/564; H04B 17/17
USPC ......................................................... 455/73
See application file for complete search history.

(56) References Cited

U.S. PATENT DOCUMENTS

| | | | | |
|---|---|---|---|---|
| 9,852,040 B1 * | 12/2017 | Munday | ................ | G06F 11/079 |
| 2004/0166815 A1 * | 8/2004 | Maligeorgos | ........... | H03L 7/085 |
| | | | | 455/73 |
| 2015/0243155 A1 * | 8/2015 | Xiong | .................. | G08B 21/182 |
| | | | | 398/135 |

* cited by examiner

*Primary Examiner* — Ajibola A Akinyemi
(74) *Attorney, Agent, or Firm* — Schwegman Lundberg & Woessner, P.A.

(57) ABSTRACT

A wireless communication device can include chains of circuitry, with at least one chain being a chain of transmitter circuitry to generate output radio frequency (RF) signals using baseband signals and at least one chain of receiver circuitry configured to receive RF signals. At least one chain can include a plurality of circuit blocks, a circuit block including at least one of oscillator circuitry, clocking circuitry, and phased lock loop (PLL) circuitry. The apparatus can include interconnect circuitry configured to couple one of the plurality of circuit blocks to a respective chain. Other systems, methods and apparatuses are described.

19 Claims, 15 Drawing Sheets

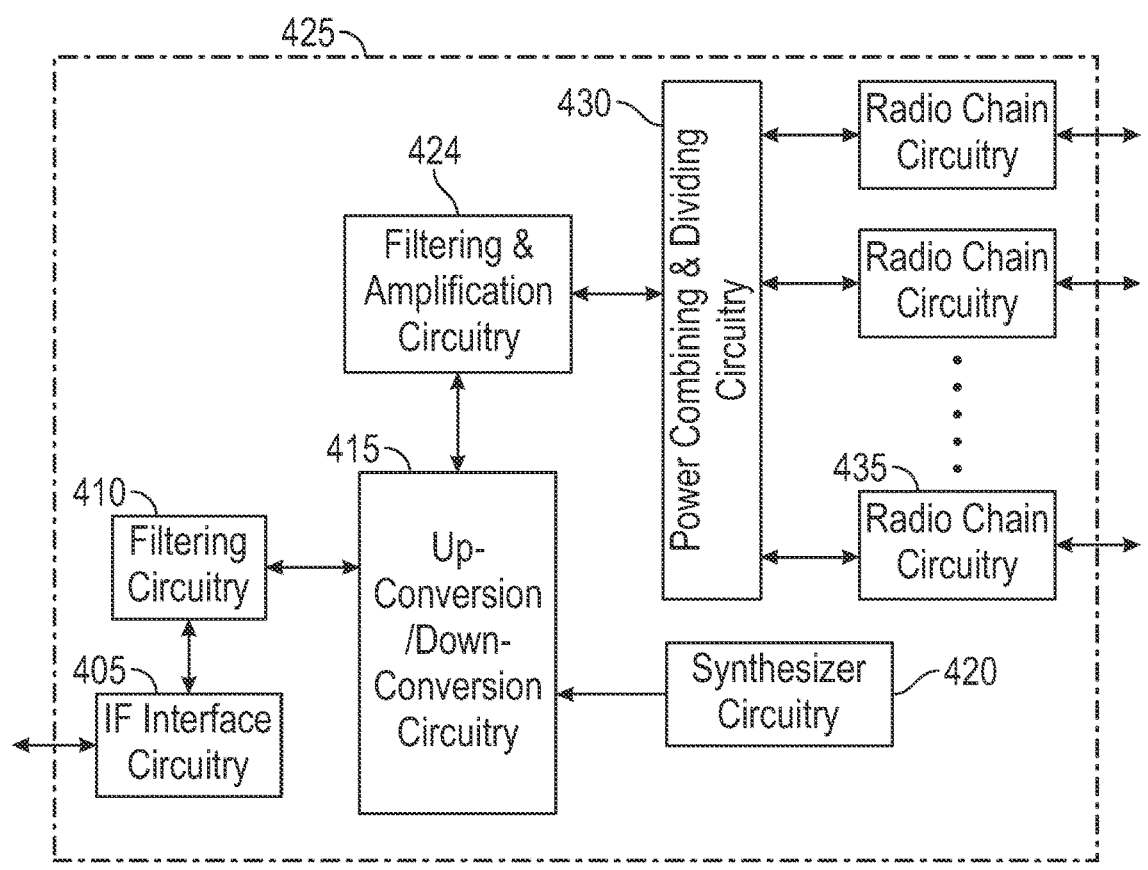
FIG. 4
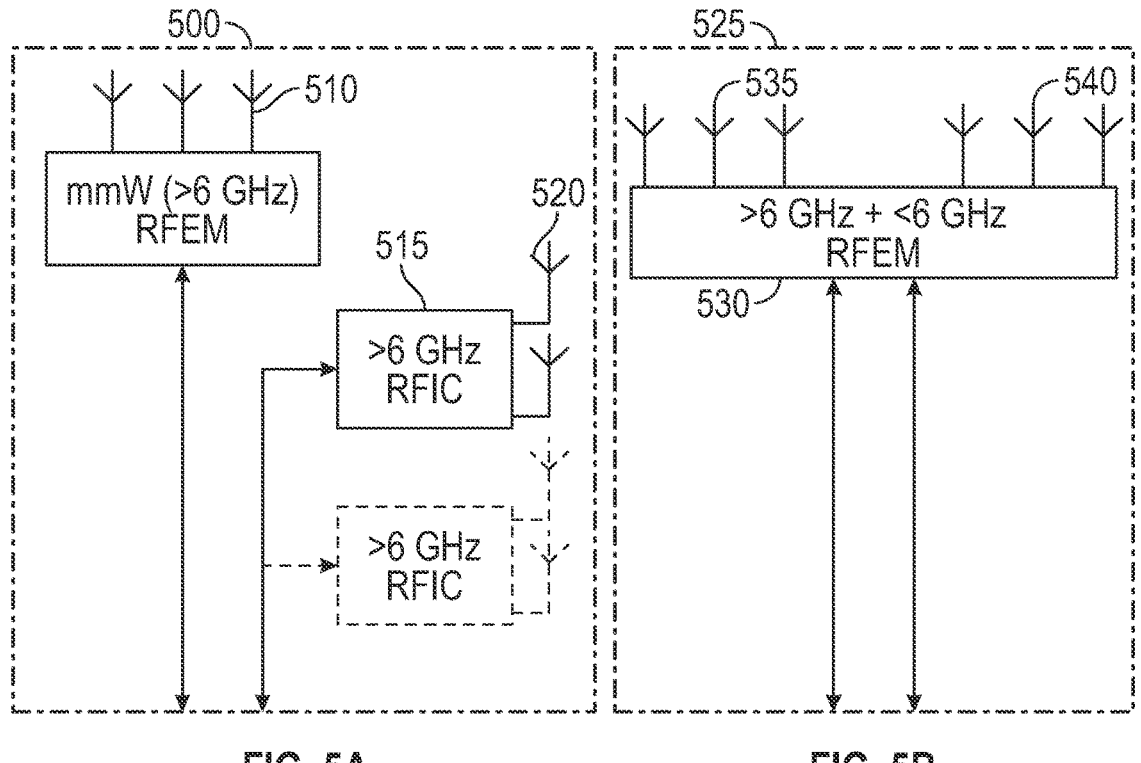
FIG. 5A FIG. 5B

1102   LDO    1000

$V_{supply}$

Reference Clock In  →   Buffered Clock out

1208   Peak Detector    1200

LDO   1206

$V_{supply}$ $V_{bias}$    $V_{bias}$ $I_{bias}$

1204

$V_{bias0}$   $V_{bias1}$   • • •   $V_{biasN}$

1202

$en_0$   $en_1$   $en_N$

CIRCUIT REDUNDANCY AND WEAR BALANCING TO IMPROVE CIRCUIT LIFETIME

TECHNICAL FIELD

Aspects of the disclosure pertain to radio frequency (RF) communications. More particularly, aspects relate to increasing lifetime of circuits, or increasing circuit performance for a given lifetime.

BACKGROUND

Radio frequency (RF) transceivers in use today support multiple communications standards and frequency bands. Circuits used in these transceivers can be degraded quickly if high bias currents and supply voltages are used, and the problem is exacerbated at higher operating temperatures. There is a general need to control bias currents and supply voltages of circuits in RF transceiver circuitry to improve and increase lifetime of such circuitry without, however, degrading circuit and transceiver performance.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which:

FIG. 4 illustrates exemplary useable RF circuitry in FIG. 3A according to some aspects.

FIG. 5A illustrates an aspect of an exemplary radio front end module (RFEM) according to some aspects.

FIG. 5B illustrates an alternate aspect of an exemplary radio front end module, according to some aspects.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

In aspects, the disclosure provides two or more multi-purpose and redundant circuits, a multiplexing interconnect and a scheduler configured to balance wear on each circuit to extend lifetime and to keep each circuit at a bias and supply point sufficient for operation of transceiver systems. Additionally, some aspects provide circuit end-of-life projection monitoring and knowledge of radio network error vector magnitude (EVM) requirements to adjust circuit conditions when communication needs permit adjustment, to reduce device stress. Apparatuses, systems, and methods in accordance with some aspects can be used in transceivers for communication on multiple frequency bands and using multiple standards having multiple similar circuit blocks with low duty cycles.

Figure 1:
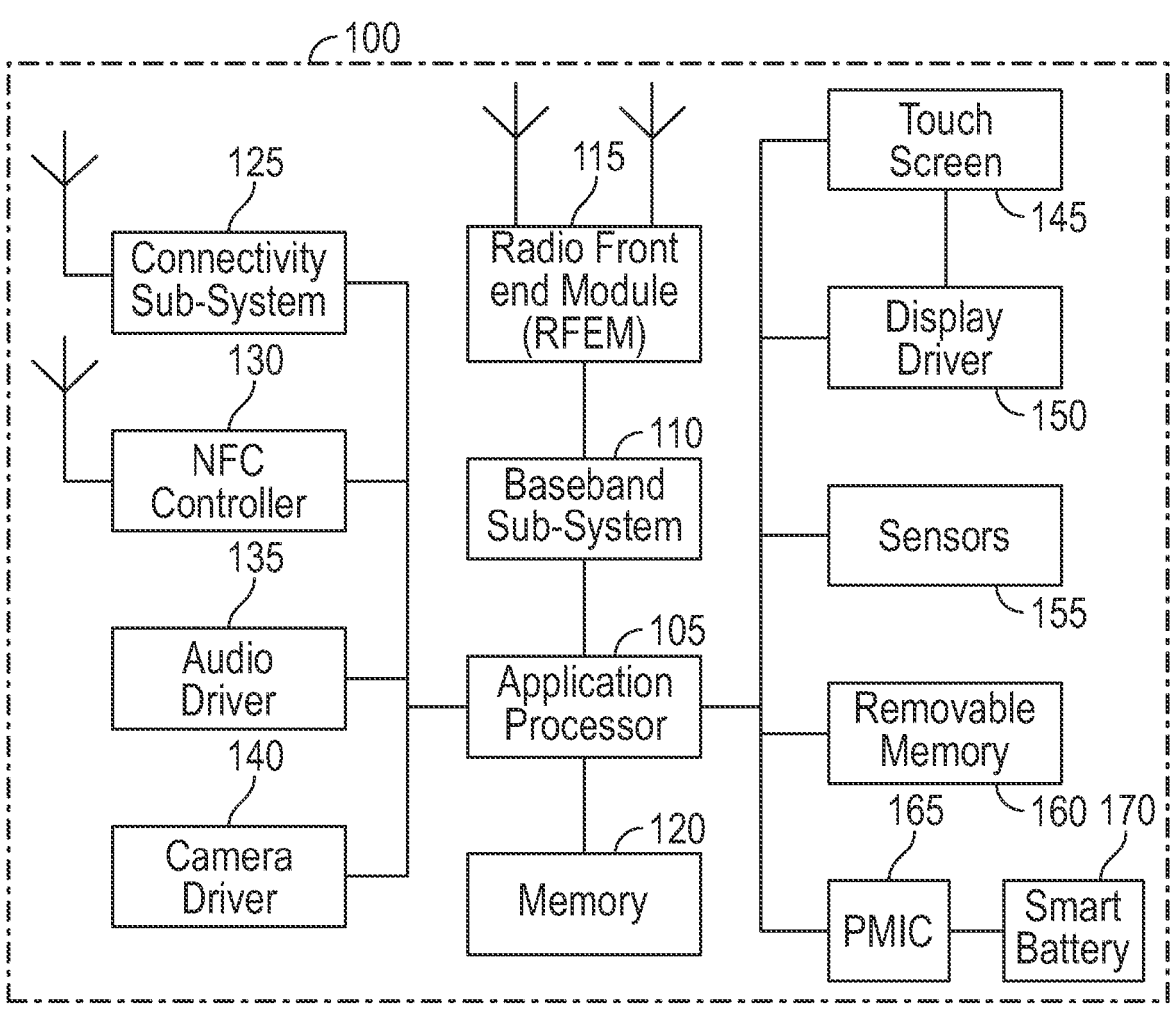
FIG. 1 illustrates an exemplary user device according to some aspects.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real time clock (RTC), timer-counters including interval and watchdog timers, general purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and the 5G FR2 band, but the mmWave technology can be applicable to a variety of telecommunications systems. The mmWave technology can be especially attractive for short-range telecommunications systems. WiGig devices operate in the unlicensed 60 GHz band, whereas 5G mmWave operates initially in the licensed 28 GHz and 39 GHz bands. A block diagram of an example baseband sub-system 110 and RFEM 115 in a mmWave system is shown in FIG. 1A.

Figure 1A:
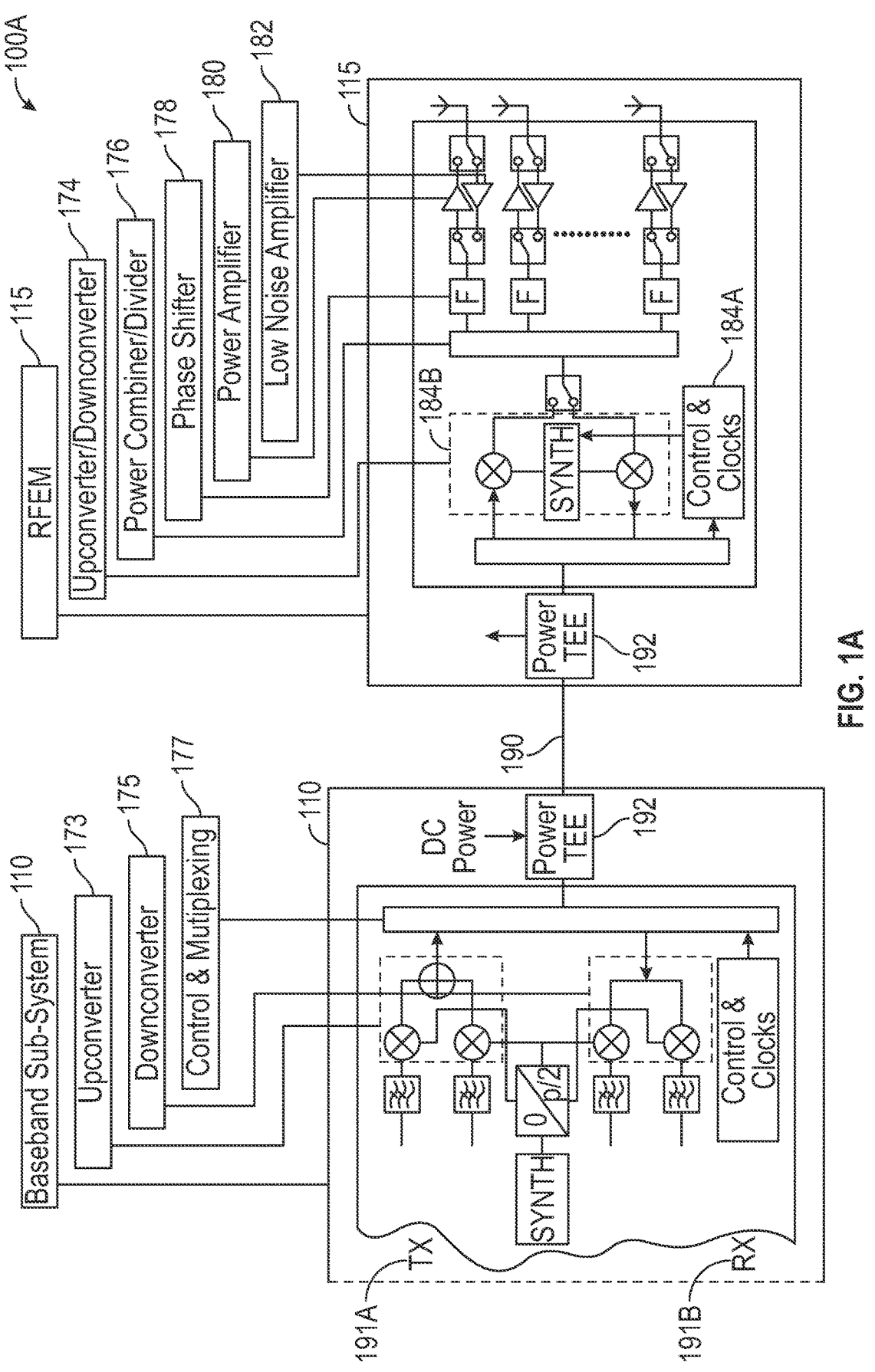
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a baseband sub-system 110 and one or more radio front end modules (RFEMs) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of analog front end. This includes a transmitter (TX) section 191A with an upconverter 173 to intermediate frequency (IF) (around 10 GHz in current implementations), a receiver (RX) section 191B with downconversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figures 2, 3A:
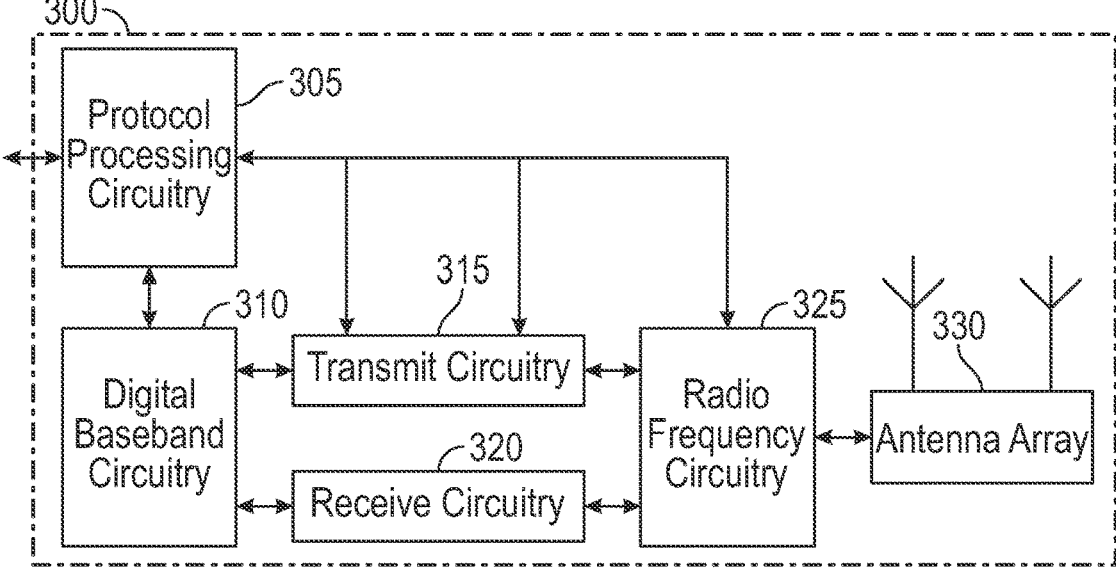
FIG. 2 illustrates an exemplary base station radio head according to some aspects.
FIG. 3A illustrates exemplary wireless communication circuitry according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3B:
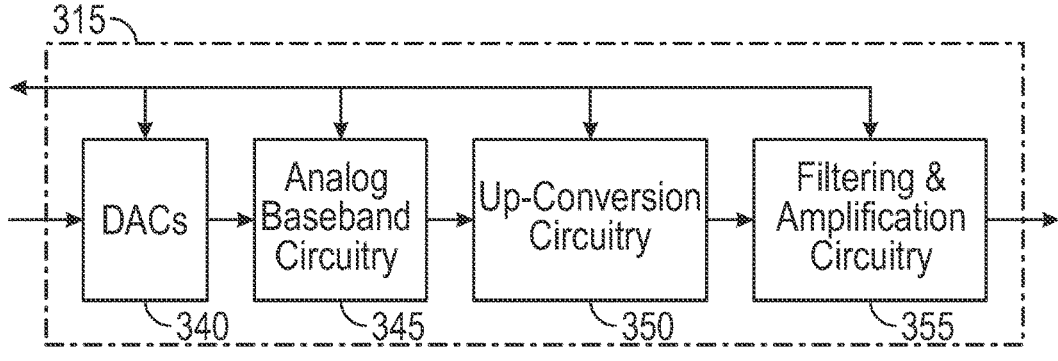
FIG. 3B illustrates aspects of exemplary transmit circuitry illustrated in FIG. 3A according to some aspects.
Figure 3C:
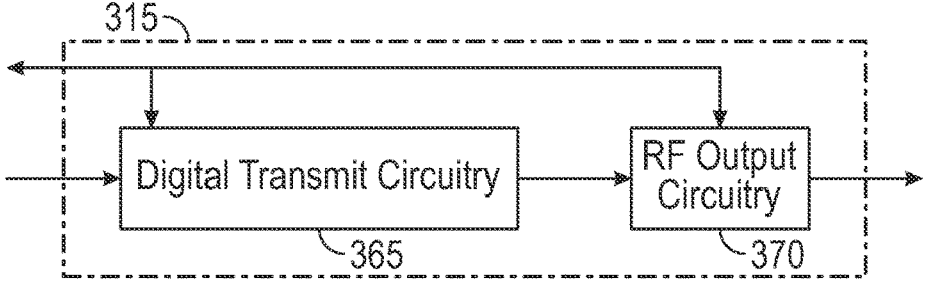
FIG. 3C illustrates aspects of exemplary transmit circuitry illustrated in FIG. 3A according to some aspects.
Figure 3D:
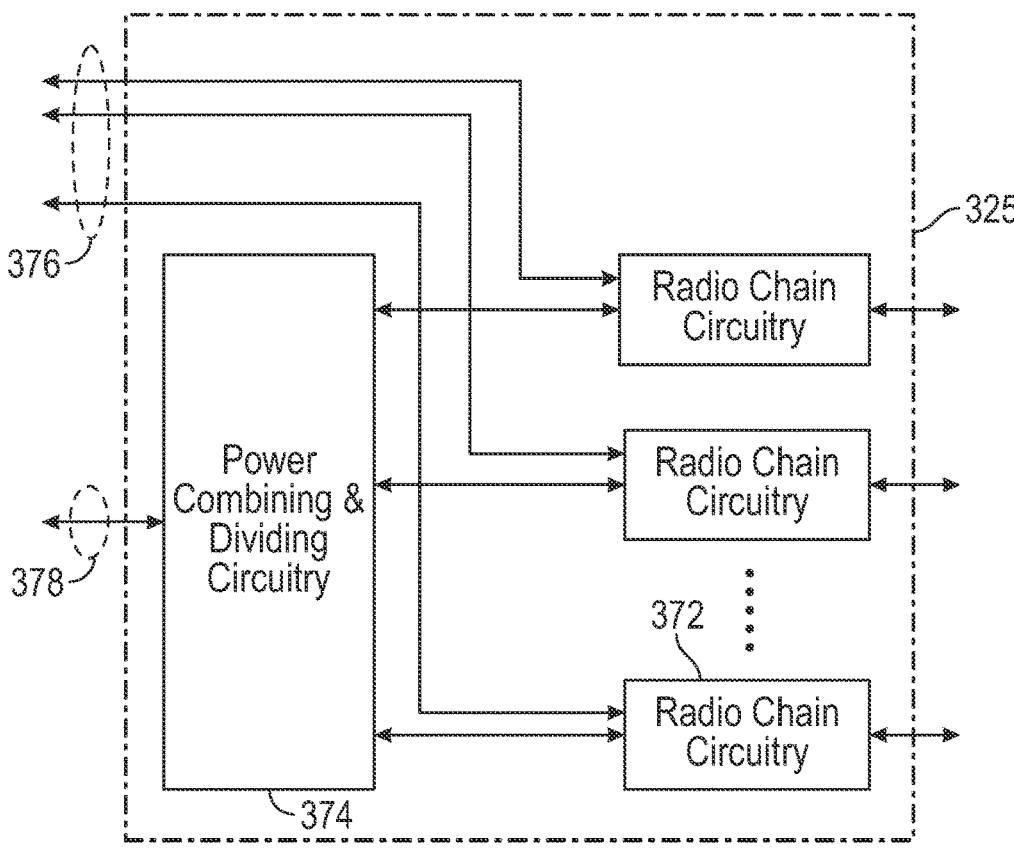
FIG. 3D illustrates aspects of exemplary radio frequency circuitry illustrated in FIG. 3A according to some aspects.
Figure 3E:
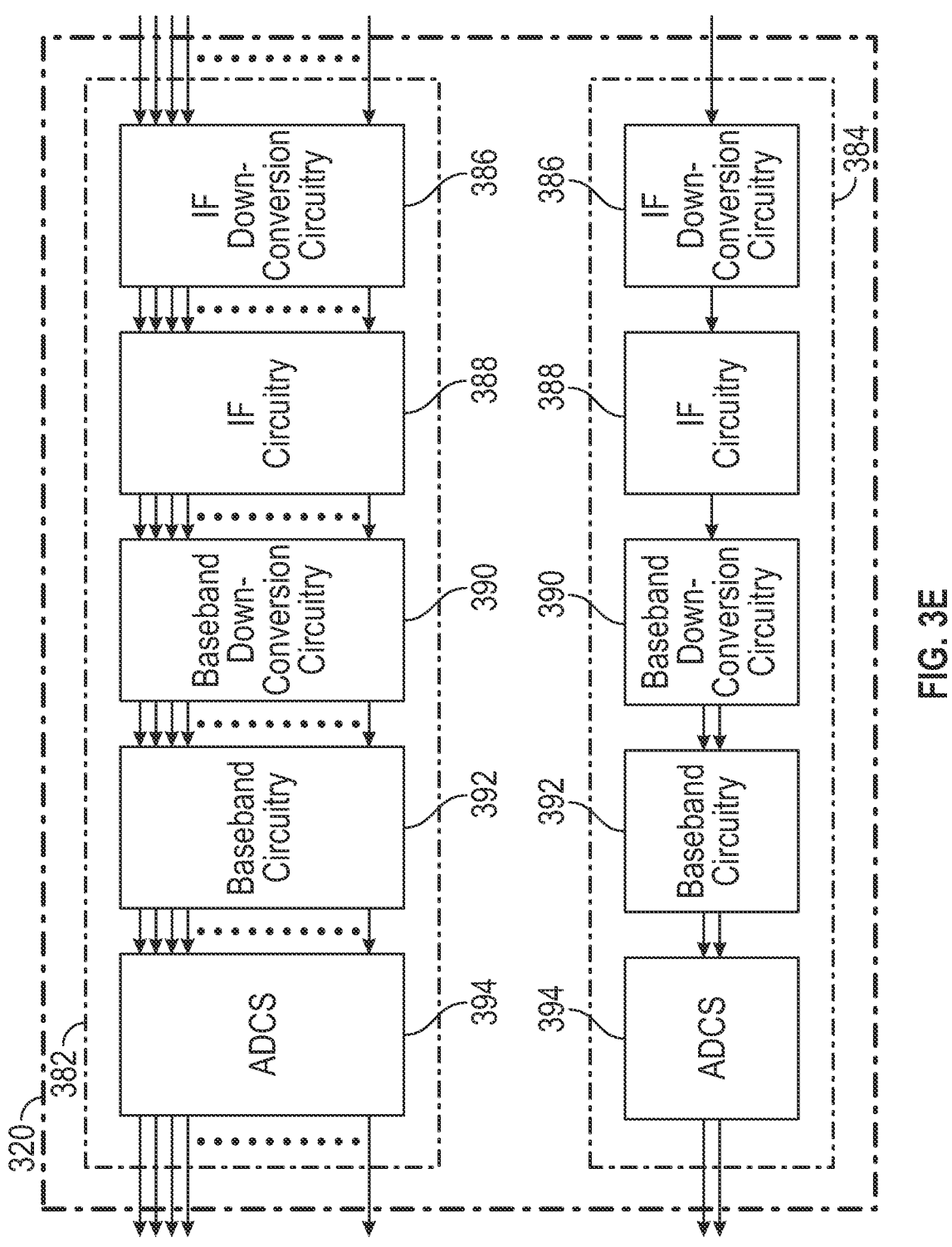
FIG. 3E illustrates aspects of exemplary receive circuitry in FIG. 3A according to some aspects.

FIG. 3A illustrates exemplary wireless communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Wireless communication circuitry 300 shown in FIG. 3A may be alternatively grouped according to functions. Components illustrated in FIG. 3A are provided here for illustrative purposes and may include other components not shown in FIG. 3A.

Wireless communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Wireless communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Wireless communication circuitry 300 may further include transmit circuitry 315, receive circuitry 320 and/or antenna array circuitry 330. Wireless communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

FIG. 5A and FIG. 5B illustrate aspects of a radio front-end module (RFEM) useable in the circuitry shown in FIG. 1 and FIG. 2, according to some aspects. FIG. 5A illustrates an aspect of a RFEM according to some aspects. RFEM 500 incorporates a millimeter wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter wave RFEM 505. RFICs 515 and 522 may include connection to one or more antennas 520. RFEM 505 may include multiple antennas 510. RFEM 525 incorporates a millimeter wave RFEM 530.

FIG. 5B illustrates an alternate aspect of a radio front end module, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
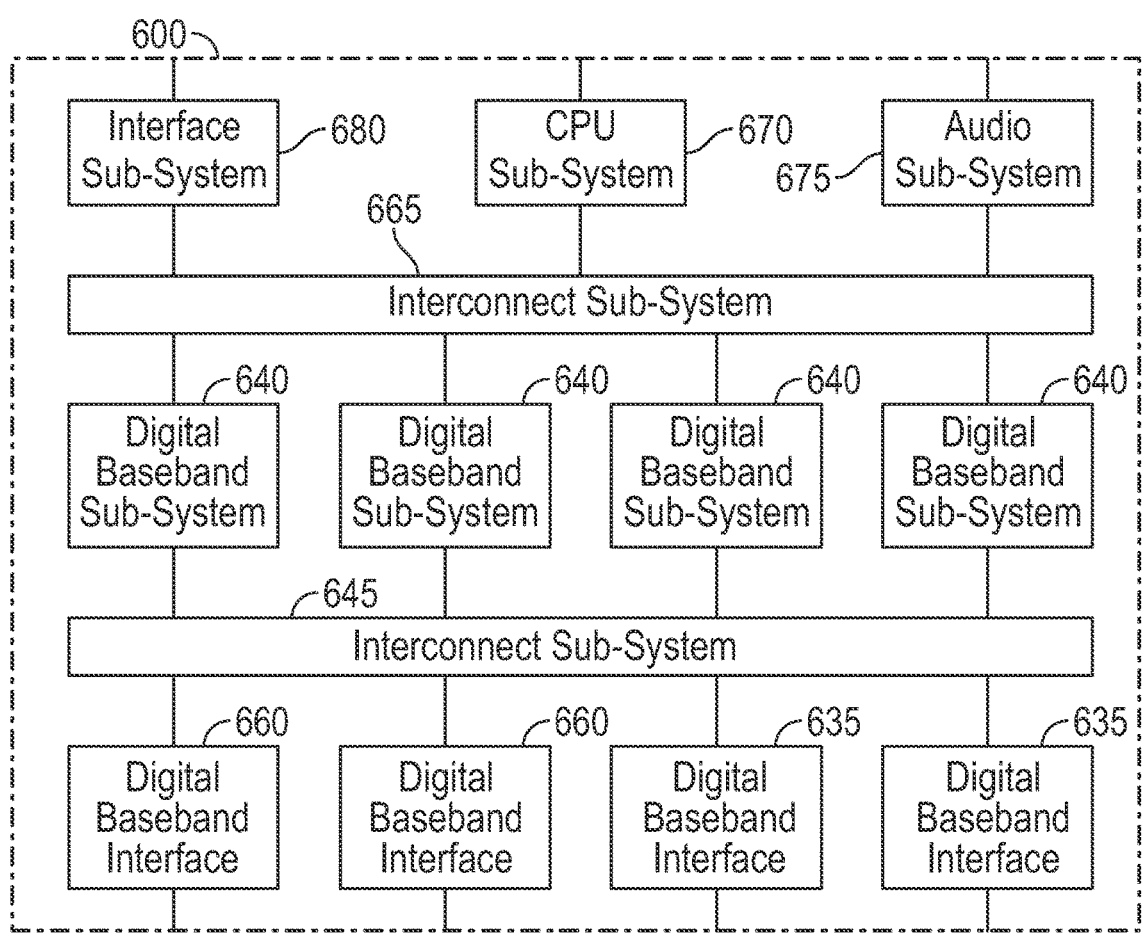
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
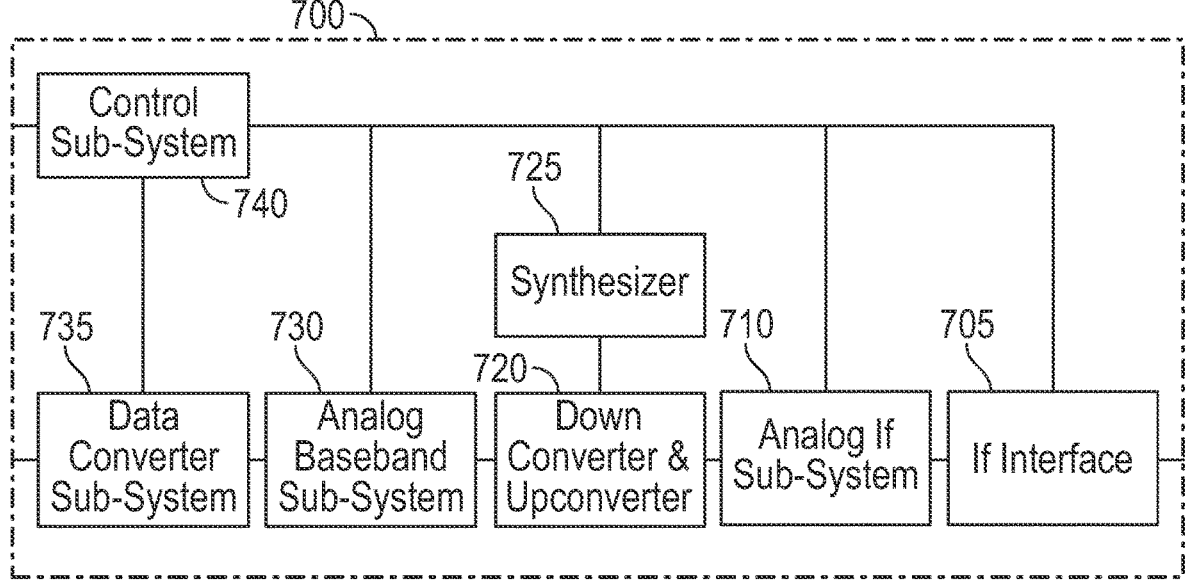
FIG. 7 illustrates an exemplary mixed signal baseband subsystem, according to some aspects.

FIG. 7 illustrates an exemplary of a mixed signal baseband subsystem 700, according to some aspects. In an aspect, mixed signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figures 8A, 8B:
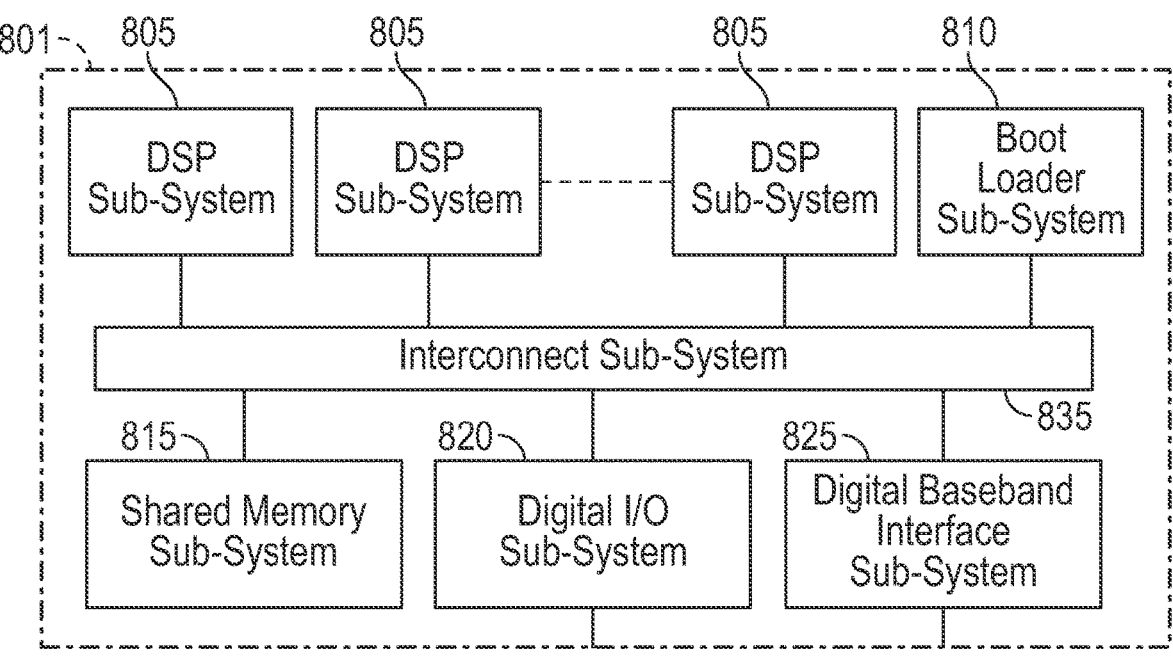
FIG. 8A illustrates an exemplary digital baseband subsystem, according to some aspects.
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, . . . 845N, buffer memory 850A, 850B, . . . 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running, and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between baseband processing subsystem and mixed signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
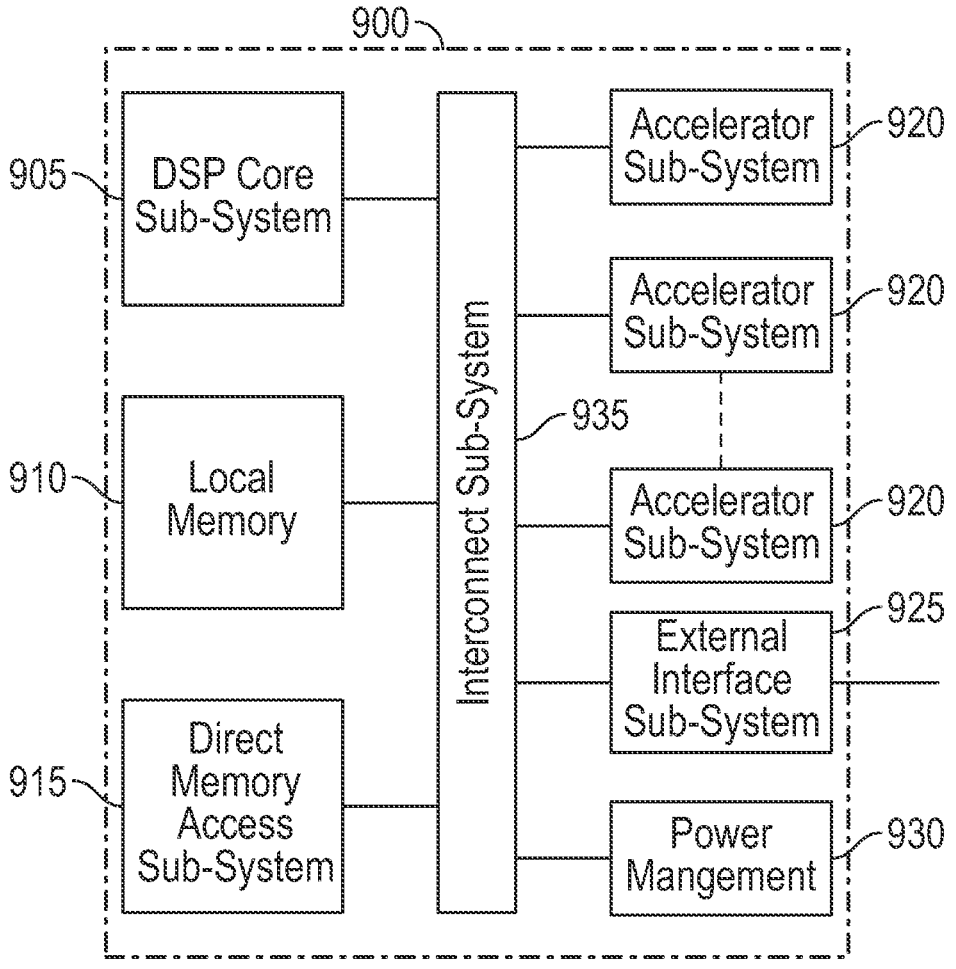
FIG. 9 illustrates an exemplary digital signal processor subsystem, according to some aspects.

FIG. 9 illustrates a digital signal processor (DSP) subsystem 900 according to some aspects. In an aspect, DSP subsystem 900 may include one or more of each of DSP core subsystem 905, local memory 910, direct memory access (DMA) subsystem 915, accelerator subsystem 920A, 920B . . . 920N, external interface subsystem 925, power management circuitry 930 and interconnect subsystem 935.

In an aspect, the local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP subsystem 900 under the control of one or more of the DMA subsystem 915 and the DSP core subsystem 905.

Redundant and Wear Balancing Circuits

Modern RF transceivers are called upon to support an increasing number of bands and communication standards on the same die. While the performance requirements are different for each band and communications standard, many of the same basic blocks are used such as frequency synthesizers, transmit chains, receive chains, and digital signal processing circuitry. The duty cycle when all bands and standards are used simultaneously is very low or zero.

Lifetime requirements of circuits place a limit on the bias currents, output voltage swings, and supply voltages that can be used. Lower bias current and supply voltage degrades noise and linearity of analog circuit blocks as well as lowers the operating frequency of digital blocks. Lower output swing will reduce the signal to noise ratio (SNR) of the output circuit driving the next input stage.

Aspects according to the disclosure therefore provide circuit blocks that can support multiple bands and standards. The blocks can meet the most stringent standard as well as provide operations on multiple bandwidths and frequencies. The blocks can reconfigure bias currents, supply voltages and tuning to save power consumption and reduce deterioration/aging.

Figure 10:
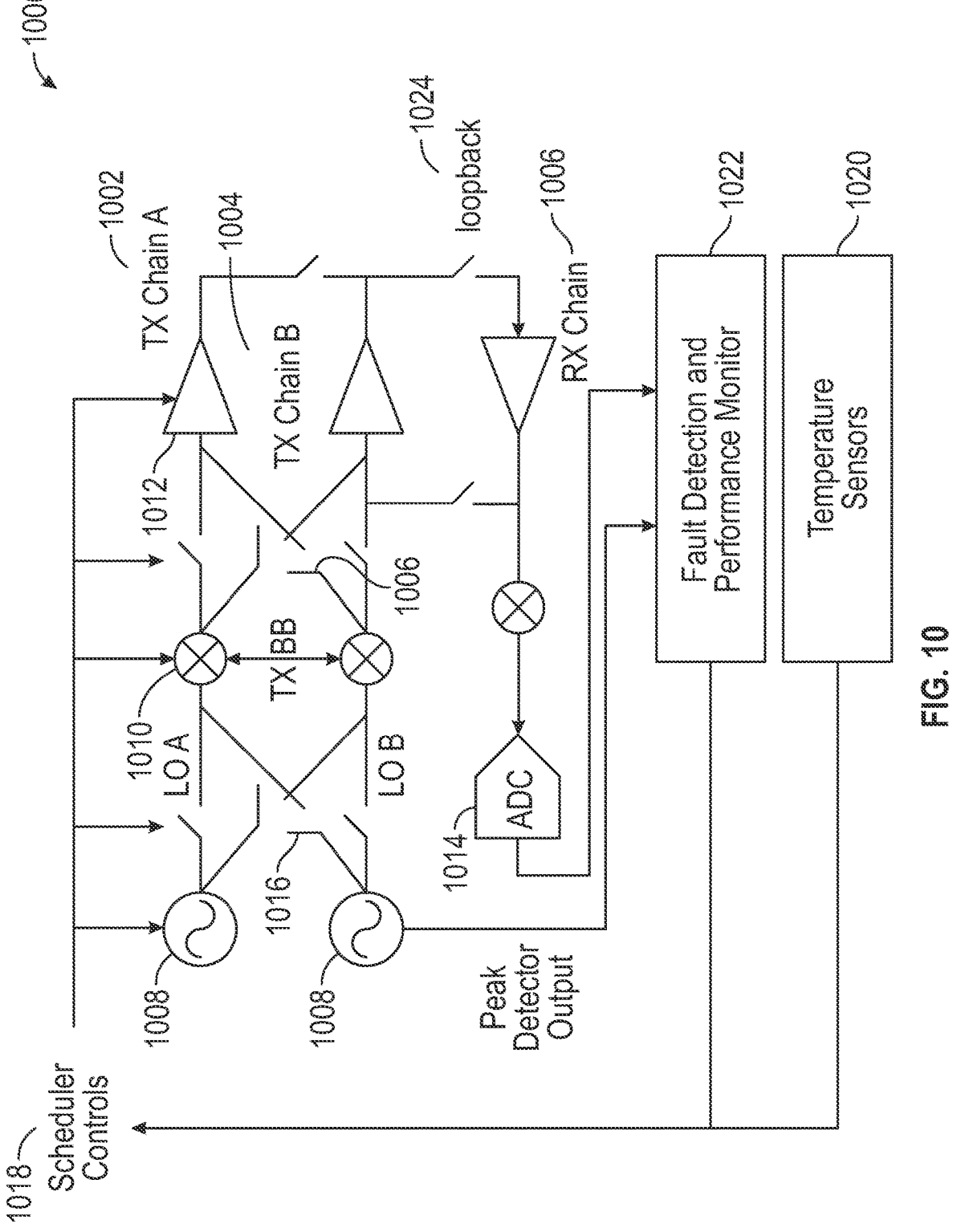
FIG. 10 illustrates an apparatus providing redundant circuitry according to some aspects.

FIG. 10 illustrates an apparatus 1000 providing redundant circuitry according to some aspects. The apparatus 1000 includes a plurality of chains of circuitry. The plurality of chains includes at least one chain of transmitter circuitry configured to generate output RF signals using baseband signals and at least one chain of receiver circuitry configured to receive RF signals. For example, the apparatus 1000 can include one chain 1002 of transmitter circuitry, a second chain 1004 of transmitter circuitry, and a chain 1006 of receiver circuitry. While three chains are shown, it will be appreciated that a device including apparatus 1000 can include more than three chains. At least two chains of the plurality of chains can be configured to transmit or receive on a same frequency band. The chains 1002, 1004 and 1006 can generate and receive RF signals using baseband signals as described earlier herein.

At least one of the plurality of chains including a plurality of circuit blocks. A circuit block can include at least one of oscillator circuitry 1008, clocking circuitry, and phased lock loop (PLL) circuitry. However, the circuit blocks can include other circuitry, including mixer circuitry 1010, amplifier circuitry 1012, ADC 1014, etc. Further, circuit blocks may omit some of the circuitry described above. Interconnect circuitry 1016 is configured to couple one of the plurality of circuit blocks to a respective chain 1002, 1004, 1006. The interconnect circuitry 1016 routes between circuit blocks enabling frequency synthesizers, transmit chains, receive chains and DSPs to connect to multiple other circuit blocks.

Redundant blocks are provided in the apparatus 1000 in some aspects and can be switched into a circuit by the interconnect 1016. With more blocks available than needed for system operation, some blocks can always be offline and available for background performance monitoring and calibration without disrupting the rest of the system.

The apparatus 1000 can further comprise scheduler circuitry 1018. The scheduler circuitry 1018 can be configured to include an interface coupled to at least one circuitry element, and the scheduler circuitry 1018 can be included within baseband circuitry or other circuitry as described with respect to FIG. 1-9. The scheduler circuitry 1018 can be configured to provide instructions to the interconnect circuitry 1016 to couple or uncouple a circuit block of the plurality of circuit blocks based on a condition of a respective one of the plurality of circuit blocks. The condition can include, for example, an amount of time the respective one of the plurality of circuit blocks has been in operation, temperature, or other condition. For example, temperature sensor circuitry 1020 can detect temperature of any or all circuit blocks in chains 1002, 1004 and 1006, among other temperature sensing. Accordingly, systems according to some aspects can spread deterioration or aging evenly across circuit blocks and can control and store data to track the amount of time each block has been used over a block lifetime, as well as temperature, bias and supply conditions. The scheduler circuitry 1018 can track, schedule and predict events such as which band or communication standard will be needed for upcoming communications, and the programmable interconnect.

In some aspects, the scheduler circuitry 1018 can provide instructions to operate the circuit blocks at varying supply voltages, biases, or output voltage swing levels based on a modulation scheme of the respective chain. For example, different supply voltages can be used for Quadrature Phase Shift Keying (QPSK), 16 Quadrature Amplitude Modulation (QAM), 64 QAM and 256 QAM and other schemes used for 5G and later standards, as well as any earlier-standard versions in which the apparatus 1000 can operation. The scheduler circuitry 1018 is configured to set the mode (wherein a mode can include a performance mode for higher bias, voltage supply or voltage swing; or a reliability mode, or another mode) for each block to meet the performance requirements for communications under these and other standards and modulation schemes. As the blocks age and lose performance at a given bias and supply condition the scheduler circuitry 1018 is configured to compensate by configuring the bias and supply conditions for a circuit block, using circuitry and methods described in more detail below. The scheduler circuitry 1018 can provide instructions to calibrate at least one non-coupled circuit block on circuits when those circuits are not in use so as to not disrupt circuits in operation with periodic calibrations. In some examples, the scheduler circuitry is configured to provide instructions to operate a circuit block only during low-load conditions of a respective chain. For example, a circuit block nearing EOL or under another restrictive condition may be enabled only during low-load conditions.

The interconnect circuitry 1016 can couple a first portion of a first circuit block simultaneously with coupling a different portion of a second circuit block. For example, an oscillator from one circuit block can be coupled simultaneously with other baseband circuitry and power amplifiers from another circuit block.

Fault detection and performance monitors 1022 can include circuitry to detect if a circuit, circuit component, or other block has failed or is not meeting performance requirements and communicate to the scheduler circuitry 1018 to no longer use the failed circuit or modify operating settings to increase performance or to only use when reduced performance is allowed.

Apparatuses according to some aspects can increase performance parameters, for example PLL DCO output voltage swing, to improve phase noise, system EVM, and overall system throughput. For example, a PLL DCO voltage swing is closely related to the overall PLL reliability. Higher swing leads to better phase noise and EVM, but degraded reliability. By monitoring system conditions, for example with temperature sensor circuitry 1020 and fault detection and performance monitors 1022, scheduler circuitry 1018 can generate and maintain an EOL projection for circuitry in operation in apparatus 1000. Loopback 1024 can be used to monitor performance of each block a chain 1002, 1004, 1006 and detect which, if any, blocks are limiting performance of the apparatus 1000. Programmable switches in the forward and loopback 1024 paths allow each block in the chain to be examined.

The scheduler circuitry 1018 or other circuitry can demodulate and compare transmitted waveforms can be demodulated and compared to a digital copy for EVM monitoring. Phase noise will dominate EVM when phase noise is observed at certain points, e.g., before RFFE circuitry, and therefore phase noise can be used as a proxy for phase noise performance. Further, the PLL reference path and VCO performance can be examined by making the PLL loop bandwidth wide or narrow and measuring the resulting EVM in the loopback 1024 to determine if the PLL/VCO is causing degraded performance.

Figures 11, 12:
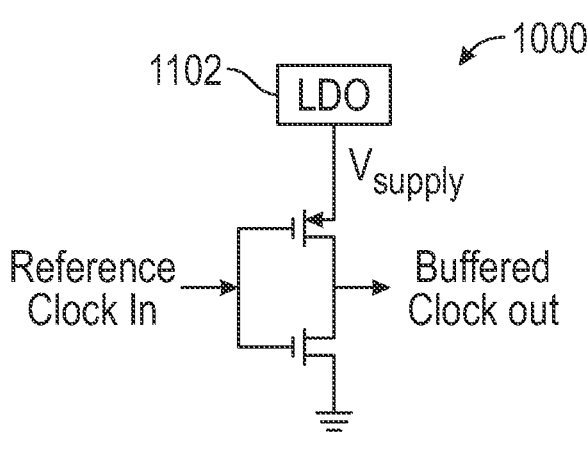
FIG. 11 illustrates a reference path with a tunable low dropout (LDO) regulator according to some aspects.
FIG. 12 illustrates a programmable voltage-controlled oscillator according to some aspects.

FIG. 11 illustrates a reference path 1100 with a tunable low dropout (LDO) regulator 1102 according to some aspects. The reference path 1100 can be made to have higher swing and lower phase noise by increasing LDO 1102 output voltage. A switching matrix, stored in scheduler circuitry 1018 or associated memory (not shown in FIG. 10 or 11) can allow for any PLL to be used with any mixer and driver combination. For example, the scheduler circuitry 1018 can control interconnect circuitry 1016 to switch in and out any PLL blocks in chains 1002, 1004, and 1006, for use with any of mixers 1010 or power amplifiers 1012, and other circuitry not shown in FIG. 10. If the scheduler circuitry 1018, in processing information from temperature sensor circuitry 1020, fault detection and performance monitors 1022, and other circuitry, detects that any circuit or circuit component is providing less-than-specified performance or has entered a failure condition or other condition, that circuit or block therein can be replaced with a block or circuit component that is not in an error condition or that is capable of providing specified performance.

On the other hand, if operating history showed lower operating temperatures and duty cycles than assumed in the standard reliability projection, the scheduler circuitry 1018 can adjust the PLL settings to maintain the targeted circuit lifetime while enhancing performance.

Generally speaking, EOL can be represented in Equation (1) as a function of the variables in parentheses:

PLL_EOL=f(Active_duty_cycle,Temperature,DCO_voltage_swing,Confidence level)

where Confidence level would typically be 95% or 99$o$ and represents the statistical confidence level at which the EOL is calculated. Active_duty_cycle is the duty cycle of the circuit element or block during operation, temperature is the temperature of the circuit element or block during operation, and DCO_voltage_swing is the voltage swing between a negative and positive peak during oscillator operation.

A margin of error or other operating margin can be provided; for example, a margin of 1-2 years can be provided so that EOL is predicted to be 1-2 years less than actual, to prevent unanticipated field failures of equipment. Alternatively, given that some base stations may have smaller utilization during certain hours of the day, the margin can be used to increase the EOL projection. This increase in EOL projection can be performed, for example, for 5G base stations for which protocol changes were made to reduce power consumption, e.g., the gNB need not send cell-specific reference signals for each DL symbol. Thus, in many cases, the base station will have operating life margin which can be used to enhance performance or forego pre-planned mitigation procedures.

In some aspects, an algorithm can be used to manage reliability and enhance device/system performance, if operating conditions are favorable. These algorithms can take into account the various independent failure mechanisms in an integrated circuit for different transistors, depending on transistor device sizes, oxide thickness, etc. The reliability of these devices can often be modeled with an exponential, Weibull, or Log-normal distribution. Additionally, the failure rate is accelerated by higher temperatures, as expressed by the Arrhenius equation acceleration factor according to Equation (2):

$$AF_T = \frac{\tau_0}{\tau_s} = \exp\left(\left(\frac{E_a}{k}\right)\left[\frac{1}{T_o} - \frac{1}{T_s}\right]\right) \tag{2}$$

where $E_\alpha$ is the activation energy for a given failure mechanism, k is Boltzmann's constant, $\tau_0$ is the device lifetime under the specified reference operating conditions for the product (at temperature $T_0$), and $\tau_S$ is the "stressed" device lifetime at an alternate (often higher) temperature $T_s$. By way of example, a certain device or product may be rated for a max steady state operating temperature $T_0$ of 110 deg C., and in an Accelerated Life test (ALT), the stress temperature $T_s$ is set to 150 deg C. to induce more failures in a smaller sample size population.

A similar voltage acceleration factor ($AV_F$), can be commonly modeled according to Equation (3):

$$AF_v = \frac{\tau_0}{t_s} = \exp(\beta(V_s - V_0)) \tag{3}$$

where $\tau_0$ is the device lifetime under the specified reference operating conditions for the product (at temperature $T_0$), and $\tau_S$ is the "stressed" device lifetime at an alternate (often higher) temperature $T_s$, $V_0$ is the normal operating voltage, and $V_s$ is the higher operating voltage used during a stress condition, and $\beta$ is a curve-fitting constant.

FIG. 12 illustrates a programmable voltage-controlled oscillator (VCO) 1200 according to some aspects. The VCO 1200 can be similar to oscillator 1008 (FIG. 10). The VCO 1200 can be tuned to increase tail current. Different bias conditions can be used by providing switches 1204 in conditions in which parasitic capacitance within the switches 1204 can be supported. The output of a voltage regulator 1206 can be raised or lowered in order to apply a varying voltage to the oscillator. The VCO 1200 can be segmented at 1202 so that the VCO 1200 can be powered down to achieve further power savings, reduce temperature, etc. A peak detector 1208 can monitor the amplitude of VCO 1200 oscillation. The amplitude can be fed back to scheduler circuitry 1018 for monitoring whether aging or deterioration is expected later or sooner than specifications. The amplitude can also be provided for machine learning purposes to learn actual effect of adjustment of duty cycles, etc.

Figure 13:
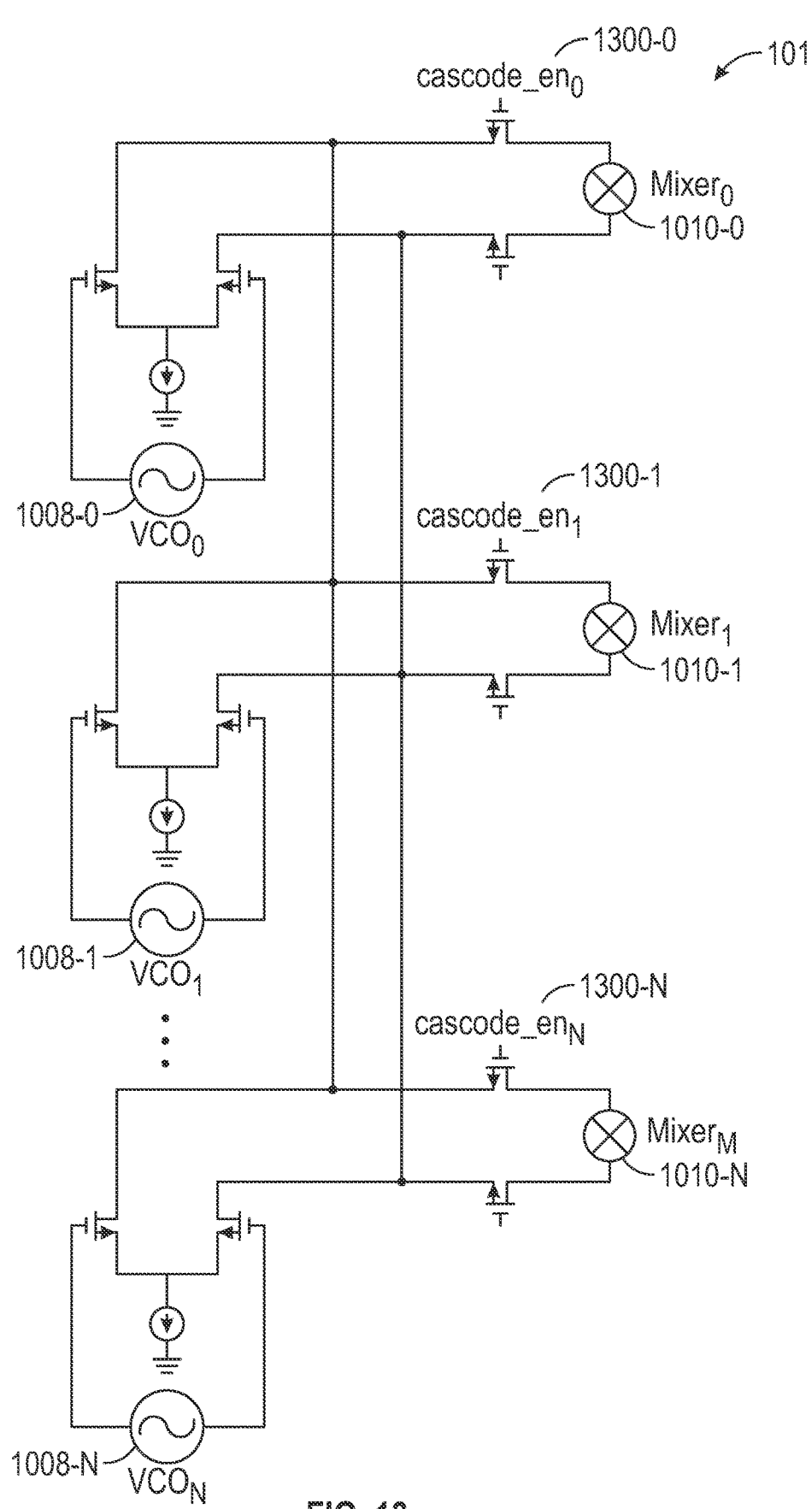
FIG. 13 illustrates further details of interconnect circuitry according to some aspects.

FIG. 13 illustrates further details of interconnect circuitry 1016 according to some aspects. As briefly mentioned with reference to FIG. 10, oscillators 1008 can be powered down as needed. Cascodes 1300-0, 1300-1 and 1300-N can be enabled or disabled to drive different mixers 1310-0, 1310-1, 1310-N. Wear can be balanced among chains 1002, 1004, 1006 (FIG. 10) by driving any interchangeable chains in different combinations, or by utilizing redundant circuit blocks as needed to balance wear among those circuit blocks or circuitry components.

Figure 14:
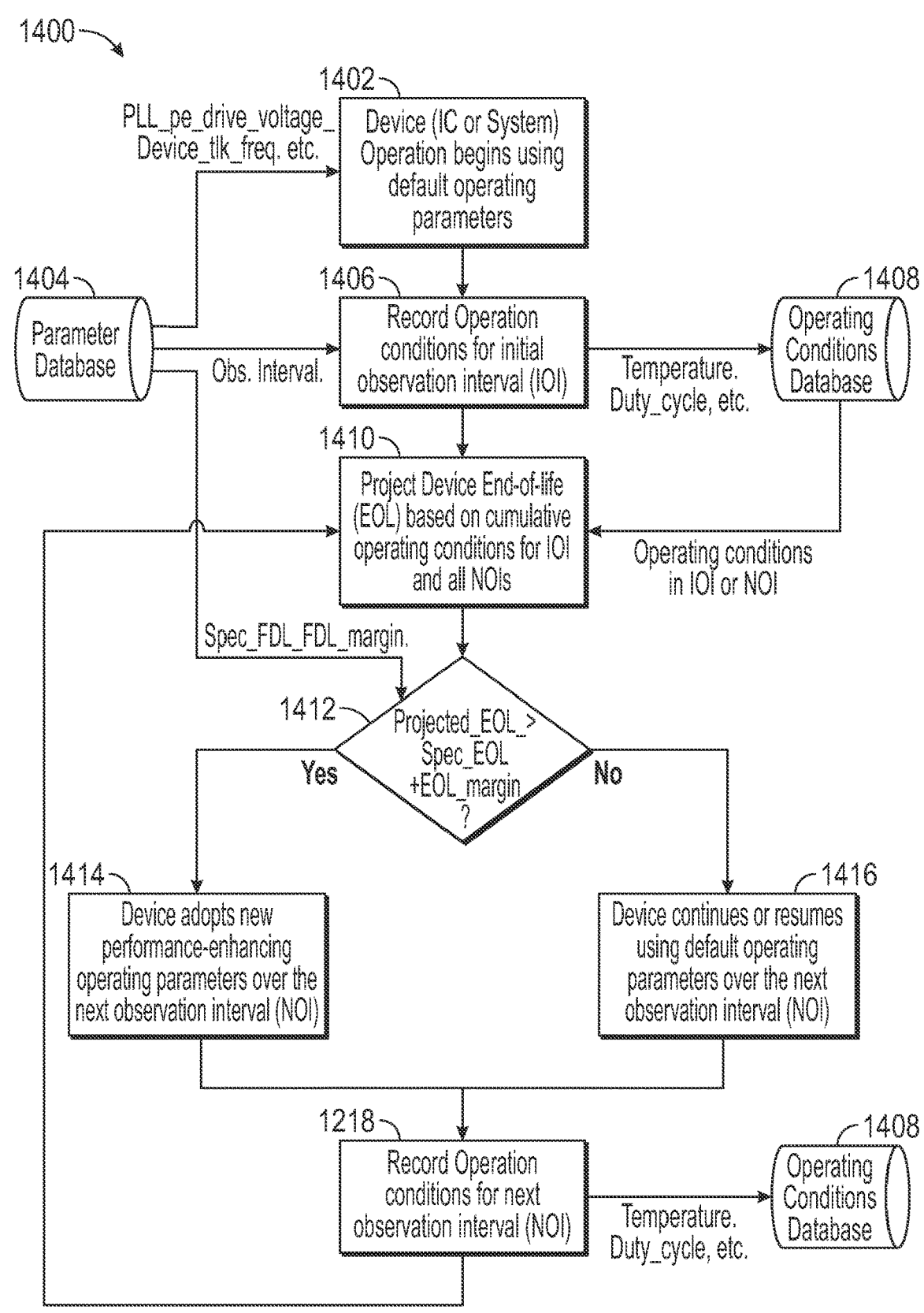
FIG. 14 illustrates a method for End-of-Life (EOL) monitoring and performance enhancement according to some aspects.

FIG. 14 illustrates a method 1400 for EOL monitoring and performance enhancement according to some aspects. In the description of method 1400, the devices referred to are the devices (e.g., IC, system, or IC sub-circuit) whose reliability and operating parameters are monitored. The operations of method 1400 can be performed by, for example, scheduler circuitry 1018 or any circuitry of FIG. 1-13 or FIG. 15-16. For example, scheduler circuitry 1018 can execute in baseband circuitry locally or remote to a base station. PLL circuitry described herein can be included in RF radio head circuitry. The scheduler circuitry 1018 can perform portions of method 1400 to monitor at least one condition of circuitry elements to predict an EOL point for the circuitry elements.

The device begins operation at block 1402, using various parameters obtained from parameter database 1404. Such parameters can include, for example, PLL drive voltage (peak-to-peak), device clock frequencies, and other parameters. After the device begins operation, the scheduler circuitry 1018 can record actual network operating parameters over a reference interval, (e.g., 6 months), which can be denoted as an initial observation interval (101) in operation 1406. During that time, no modifications to PLL or other circuit parameters are made. The observation interval or other parameters for determining monitoring time can be obtained from the parameter database 1404. The scheduler circuitry can record various temperature, duty cycle, oscillator voltage swings, LDO voltages, and other observations in the operating conditions database 1408.

Table 1 illustrates acceleration factors in a PLL circuit component. The $T_j$_use column provides values for the temperature used when calculating Acceleration factor AF_T from Equation 2 above. The PLL_voltage_swing column illustrates voltage swings that provide the voltage Acceleration factor AF_V similarly to Equation 3 above.

TABLE 1 temperature and PLL voltage acceleration factors

| Tj_use | AF_T | PLL_voltage_swing (Vpp) | AF_V |
|---|---|---|---|
| 65 | 0.022390003 | | |
| 70 | 0.045647711 | | |
| 75 | 0.084632117 | | |
| 80 | 0.145256935 | | |
| 85 | 0.233958245 | | |
| 90 | 0.357387754 | | |
| 95 | 0.522122515 | | |
| 100 | 0.734415612 | | |
| 105 | 1.00000 | 1.2 | 1.00000 |
| 110 | 1.323948219 | 1.3 | 1.349858808 |
| 115 | 1.710584456 | 1.4 | 1.8221188 |
| 120 | 2.163441964 | 1.5 | 2.459603111 |
| 125 | 2.685257382 | 1.6 | 3.320115923 |

Based on a table similar to Table 1, above, with acceleration factors for PLL voltage (AF_V) also included, in operation 1410, the scheduler circuitry 1018 can determine the operating trend and compute excess wear (e.g., due to higher-than-expected operating temps) is being accumulated, or extra life is being accumulated by favorable or less strenuous wear factors. Any calculation determined in operation 1410 can be extrapolated or projected over a specific device lifetime (e.g., 10 years in a typical industrial base station). By way of example, if after 6 months of physical operation at 100% duty cycle, only 4 months of "equivalent wear" is accumulated due to better-than-expected or more benign operating conditions such as lower temperature, then projecting out 10 years (a typical life expectancy for the given circuit component), this would provide 10 years*(4/6)=6.67 years, leading to 3.33 years more life than the 10 years projected in manufacturer specifications.

Accuracy of the predictions can be improved if actual duty cycle during operation is known. For example if actual duty cycle for the device is 90%, then (using values calculated above) 6 months*(1−0.9)=0.6 months of "extra life" can be accumulated. It can be appreciated from Table 1 that harsher operating conditions (e.g., temps >105 deg C.) can take away this extra life.

In operation 1412, the scheduler circuitry 1018 can assess whether the projected lifetime exceeds the specified lifetime (10 years in the above example), plus some additional "EOL_margin" obtained from the parameter database 1404. The EOL_margin can be considered to be a reliability safety factor that would account for the statistical uncertainty associated with any reliability equation, and could be set to, say, a number such as 2 years. If projected lifetime exceeds specified lifetime, then the scheduler circuitry 1018 can adopt new performance-enhanced operating parameters by, for example, increasing the DCO output voltage swing for better PLL phase noise in operation 1414. Otherwise, the scheduler circuitry 1018 can continue, in operation 1416, with the default operating parameters. In operation 1418, the scheduler circuitry 1018 can continue to monitor operating parameters for the next observation interval (NOI), which could be the same length as the Initial Observation Interval or different. Similarly to operation 1406, the scheduler circuitry 1018 or accompanying sensors and other monitoring circuitry) can record measurements in database 1408. The scheduler circuitry 1018 can continue to perform operations 1410, 1412, 1414 and 1416 as needed, recording revised observation intervals, measurements, and other data for use in subsequent iterations. In some examples, if operating conditions are particularly severe or particularly non-severe, measurements or projections can be adapted or the scheduler circuitry 1018 can determine that a particular measurement is an outlier and not adjust any projections. For example, if operating conditions become overly favorable for one or two observation intervals, the scheduler circuitry may determine that the relevant observation was an outlier and not adjust EOL projections, PLL parameters, or other controls of the apparatus 1000 or related devices.

Table 2 is an example of a "wearout operating journal" table that can be generated and used by the scheduler circuitry 1018 to track an operating profile of the IC or system being monitored. The "Hrs." column indicates the number of hours that the device has been operating at the temperature indicated in the "Temp." column, where temperature is given in degrees Centigrade. "Temp AF" indicates temperature acceleration as calculated according to Equation (2). For example, "Temp AF" indicates whether EOL is accelerated during that time, wherein values less than one can indicate that projected EOL should be greater than specified for that device (e.g., 10 years in the above example), and values greater than one indicate that projected EOL would be decreased. "PLL V" indicates PLL voltage swing during the indicated time, and V_AF indicates voltage acceleration factor calculated as according to Equation (3) for example. "Cum Equiv. Hrs." indicates the equivalent time a device is considered to have run at a given temperature. For example, at temperatures of 80° C. cumulative equivalent hours are actually less than the number of hours given in the "Hrs." column. The "Excess?" column indicates whether excess wear is being observed, e.g., if during X physical hours of operation an equivalent wear of >X hours was observed, then the projected EOL would be <10 years. If the equivalent usage is <X hours, then the device has accumulated "use credits" and the projected EOL is >10 years as shown in the rightmost column.

TABLE 2

| | | | | | Example of "wearout operating journal" table | | | |
|---|---|---|---|---|---|---|---|---|
| Hrs. | Temp. | Temp AF | PLL V | V_AF | Cum. Equiv. Hrs. | Excess? | Extra | Proj. EOL |
| 40 | 80 | 0.145256935 | 1.4 | 1.8221 | 10.5870157 | | | |
| 180 | 85 | 0.233958245 | 1.4 | 1.8221 | 76.73394888 | | | |
| 180 | 90 | 0.357387754 | 1.4 | 1.8221 | 91.16841246 | | | |
| 390 | 95 | 0.522122515 | 1.3 | 1.3498 | 274.8687537 | | | |
| 340 | 100 | 0.734415612 | 1.3 | 1.3498 | 337.0615099 | | | |
| 1000 | 105 | 1 | 1.2 | 1.0000 | 1000 | | | |
| 50 | 110 | 1.323948219 | 1.2 | 1.0000 | 66.19741095 | | | |
| 20 | 115 | 1.710584456 | 1.2 | 1.0000 | 34.21168912 | | | |
| 0 | 120 | 2.163441964 | 1.2 | 1.0000 | 0 | | | |
| 0 | 125 | 2.685257382 | 1.2 | 1.0000 | 0 | | | |
| 2160 | | | | | | No | 269.17125 | 11.4 |

Referring again to FIG. 10, in some examples, scheduler circuitry 1018 can perform mitigation to reduce wear on circuit components or blocks within chains 1002, 1004, 1006. The scheduler circuitry 1018 can reduce DCO_voltage_swing for PDCCH symbols if all users are reasonably close to the base station, since PDCCH symbols use a fixed QPSK 1/3 modulation. There are typically two PDCCH symbols per 14-symbol slot, so reducing the PLL swing during these symbols provides a non-trivial amount of reliability enhancement. In other examples, forced air cooling can be applied to reduce die temperature, thereby providing improved operating conditions to circuit components.

Other Systems and Apparatuses

Figure 15:
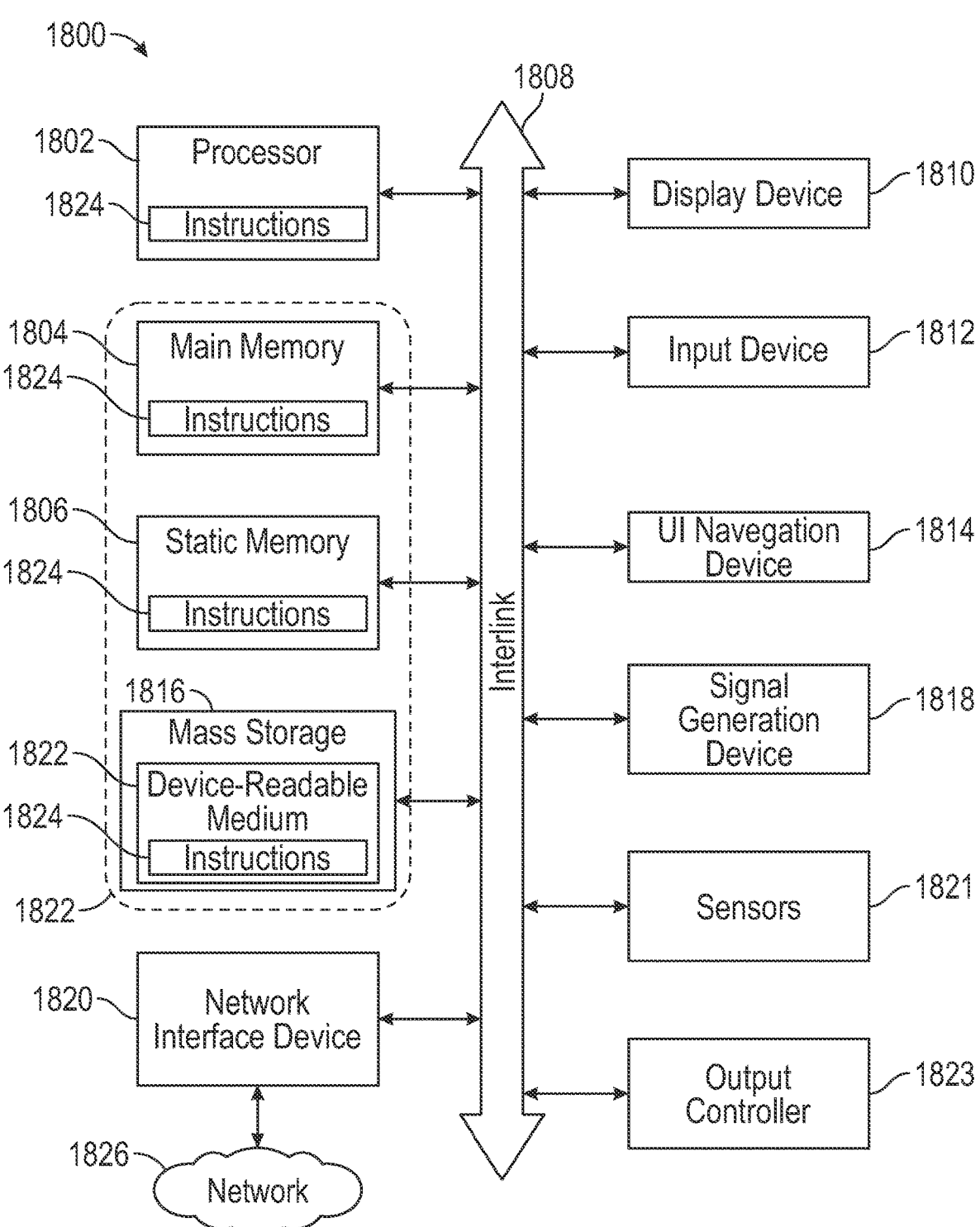
FIG. 15 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 15 illustrates a block diagram of a communication device 1800 such as an evolved Node-B (eNB), a new generation Node-B (gNB), an access point (AP), a wireless station (STA), a mobile station (MS), or a user equipment (UE), in accordance with some aspects. In alternative aspects, the communication device 1800 may operate as a standalone device or may be connected (e.g., networked) to other communication devices. In some aspects, the communication device 1800 can use one or more of the techniques and circuits discussed herein, in connection with any of FIG. 1-FIG. 14.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation.

Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1800 may include a hardware processor 1802 (e.g., a central processing unit (CPU), a graphics processing unit (GPU), a hardware processor core, or any combination thereof), a main memory 1804, a static memory 1806, and mass storage 1816 (e.g., hard drive, tape drive, flash storage, or other block or storage devices), some or all of which may communicate with each other via an interlink (e.g., bus) 1808.

The communication device 1800 may further include a display unit 1810, an alphanumeric input device 1812 (e.g., a keyboard), and a user interface (UT) navigation device 1814 (e.g., a mouse). In an example, the display unit 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or other sensor. The communication device 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1816 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage 1816 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage 1816 may constitute the device-readable medium 1822.

As used herein, the term "device-readable medium" is interchangeable with "computer-readable medium" or "machine-readable medium". While the communication device-readable medium 1822 is illustrated as a single medium, the term "communication device-readable medium" may include a single medium or multiple media (e.g., a centralized or distributed database, and/or associated caches and servers) configured to store the one or more instructions 1824.

The term "communication device-readable medium" may include any medium that is capable of storing, encoding, or carrying instructions for execution by the communication device 1800 and that cause the communication device 1800 to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MIMO, or multiple-input single-output (MISO) techniques. In some examples, the network interface device 1820 may wirelessly communicate using Multiple User MIMO techniques.

The term "transmission medium" shall be taken to include any intangible medium that is capable of storing, encoding, or carrying instructions for execution by the communication device 1800, and includes digital or analog communications signals or other intangible medium to facilitate communication of such software. In this regard, a transmission medium in the context of this disclosure is a device-readable medium.

Figure 16:
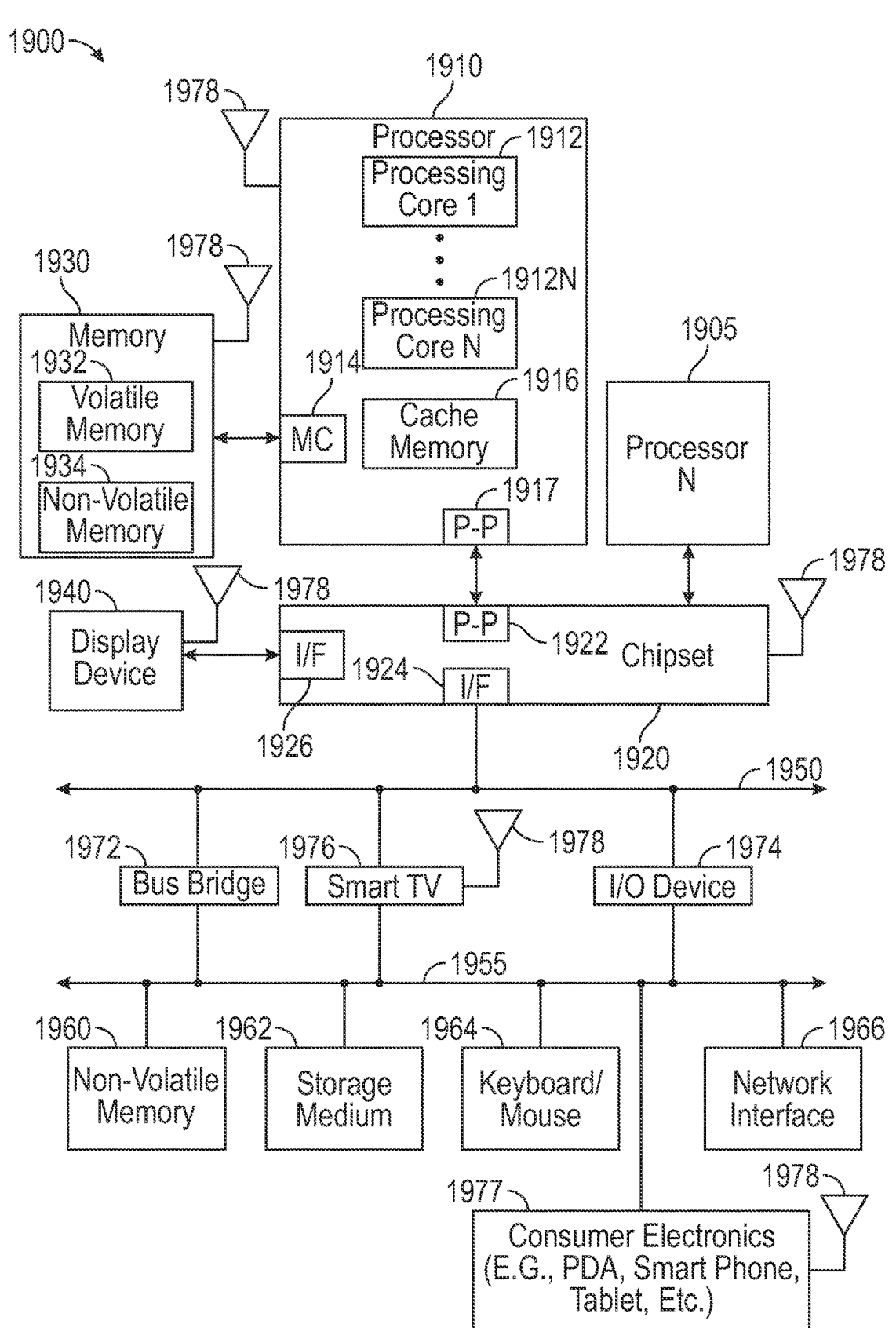
FIG. 16 illustrates a system level diagram, depicting an example of an electronic device (e.g., system) that can include, for example, a transmitter configured to selectively fan out a signal to one of multiple communication channels.

FIG. 16 illustrates a system level diagram, depicting an example of an electronic device (e.g., system) that can include, for example, a transmitter configured to selectively fan out a signal to one of multiple communication channels.

FIG. 16 is included to show an example of a higher-level device application for the subject matter discussed above with regards to FIGS. 1-17. In one aspect, system 1900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance, or any other type of computing device. In some aspects, system 1900 is a system on a chip (SOC) system.

In one aspect, processor 1910 has one or more processor cores 1912, . . . , 1912N, where 1912N represents the Nth processor core inside processor 1910 where N is a positive integer. In one aspect, system 1900 includes multiple processors including 1910 and 1905, where processor 1905 has logic similar or identical to the logic of processor 1910. In some aspects, processing core 1912 includes, but is not limited to, pre-fetch logic to fetch instructions, decode logic to decode the instructions, execution logic to execute instructions and the like. In some aspects, processor 1910 has a cache memory 1916 to cache instructions and/or data for system 1900. Cache memory 1916 may be organized into a hierarchal structure including one or more levels of cache memory.

In some aspects, processor 1910 includes a memory controller 1914, which is operable to perform functions that enable the processor 1910 to access and communicate with memory 1930 that includes a volatile memory 1932 and/or a non-volatile memory 1934. In some aspects, processor 1910 is coupled with memory 1930 and chipset 1920. Processor 1910 may also be coupled to a wireless antenna 1978 to communicate with any device configured to transmit and/or receive wireless signals. In one aspect, an interface for wireless antenna 1978 operates in accordance with, but is not limited to, the IEEE 802.11 standard and its related family, Home Plug AV (HPAV), Ultra Wide Band (UWB), Bluetooth, WiMax, or any form of wireless communication protocol.

In some aspects, volatile memory 1932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1934 includes, but is not limited to, flash memory, phase change memory (PCM), read-only memory (ROM), electrically erasable programmable read-only memory (EEPROM), or any other type of non-volatile memory device.

Memory 1930 stores information and instructions to be executed by processor 1910. In one aspect, memory 1930 may also store temporary variables or other intermediate information while processor 1910 is executing instructions. In the illustrated aspect, chipset 1920 connects with processor 1910 via Point-to-Point (PtP or P-P) interfaces 1917 and 1922. Chipset 1920 enables processor 1910 to connect to other elements in system 1900. In some aspects of the example system, interfaces 1917 and 1922 operate in accordance with a PtP communication protocol such as the Intel® QuickPath Interconnect (QPI) or the like. In other aspects, a different interconnect may be used.

In some aspects, chipset 1920 is operable to communicate with processor 1910, 1905N, display device 1940, and other devices, including a bus bridge 1972, a smart TV 1976, I/O devices 1974, nonvolatile memory 1960, a storage medium (such as one or more mass storage devices) 1962, a keyboard/mouse 1964, a network interface 1966, and various forms of consumer electronics 1977 (such as a PDA, smart phone, tablet etc.), etc. In one aspect, chipset 1920 couples with these devices through an interface 1924. Chipset 1920 may also be coupled to a wireless antenna 1978 to communicate with any device configured to transmit and/or receive wireless signals.

Chipset 1920 connects to display device 1940 via interface 1926. Display 1940 may be, for example, a liquid crystal display (LCD), a plasma display, cathode ray tube (CRT) display, or any other form of visual display device. In some aspects of the example system, processor 1910 and chipset 1920 are merged into a single SOC. In addition, chipset 1920 connects to one or more buses 1950 and 1955 that interconnect various system elements, such as I/O devices 1974, nonvolatile memory 1960, storage medium 1962, a keyboard/mouse 1964, and network interface 1966. Buses 1950 and 1955 may be interconnected together via a bus bridge 1972.

In one aspect, mass storage device 1962 includes, but is not limited to, a solid-state drive, a hard disk drive, a universal serial bus flash memory drive, or any other form of computer data storage medium. In one aspect, network interface 1966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one aspect, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 16 are depicted as separate blocks within the system 1900, the functions performed by some of these blocks may be integrated within a single semiconductor circuit or may be implemented using two or more separate integrated circuits. For example, although cache memory 1916 is depicted as a separate block within processor 1910, cache memory 1916 (or selected aspects of 1916) can be incorporated into processor core 1912.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a hand-held device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communica-tion station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks-Specific requirements Part 11: Wireless LAN Medium Access Control (MAC) and Physical Layer (PHY) Specifications, Dec. 7, 2016); IEEE 802.11ay (P802.11ay Standard for Information Technology-Telecommunications and Information Exchange Between Systems Local and Metropolitan Area Networks-Specific Requirements Part 11: Wireless LAN Medium Access Control (MAC) and Physical Layer (PHY) Specifications-Amendment: Enhanced Throughput for Operation in License-Exempt Bands Above 45 GHz)) and/or future versions and/or derivatives thereof, devices and/or networks operating in accordance with exist-ing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifica-tions (including Wireless Gigabit Alliance, Inc WiGig MAC and PHY Specification Version 1.1, April 2011, Final speci-fication) and/or future versions and/or derivatives thereof, devices and/or networks operating in accordance with exist-ing cellular specifications and/or protocols, e.g., 3rd Gen-eration Partnership Project (3GPP), 3GPP Long Term Evo-lution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Com-munication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) trans-ceiver or device, a device having one or more internal antennas and/or external antennas, Digital Video Broadcast (DVB) devices or systems, multi-standard radio devices or systems, a wired or wireless handheld device, e.g., a Smart-phone, a Wireless Application Protocol (WAP) device, or the like.

Some aspects may be used in conjunction with one or more types of wireless communication signals and/or sys-tems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communica-tion, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the commu-nication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communi-cating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a fre-quency band within the frequency band of between 20 GHz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Additional Notes and Aspects

Example 1 is an apparatus, comprising: a plurality of chains of circuitry, the plurality of chains including at least one chain of transmitter circuitry configured to generate output radio frequency (RF) signals using baseband signals and at least one chain of receiver circuitry configured to receive RF signals, at least one of the plurality of chains including a plurality of circuit blocks, a circuit block of the plurality of circuit blocks including at least one of oscillator circuitry, clocking circuitry, and phased lock loop (PLL) circuitry; and interconnect circuitry configured to couple one of the plurality of circuit blocks to a respective chain.

In Example 2, the subject matter of Example 1 can optionally comprise scheduler circuitry, the scheduler circuitry configured to provide instructions to the interconnect circuitry to couple or uncouple a circuit block of the plurality of circuit blocks based on a condition of a respective one of the plurality of circuit blocks.

In Example 3, the subject matter of Example 2 can optionally include wherein the condition includes an amount of time the respective one of the plurality of circuit blocks has been in operation.

In Example 4, the subject matter of Example 2 can optionally include wherein the condition includes temperature.

In Example 5, the subject matter of Example 2 can optionally include wherein the scheduler circuitry is configured to provide instructions to operate the plurality of circuit blocks at varying supply voltages based on a modulation scheme of the respective chain.

In Example 6, the subject matter of Example 2 can optionally include wherein the scheduler circuitry is configured to provide instructions to calibrate at least one non-coupled circuit block.

In Example 7, the subject matter of Example 2 can optionally include wherein the scheduler circuitry is configured to provide instructions to operate a circuit block only during low-load conditions of a respective chain.

In Example 8, the subject matter of any one of Examples 1-7 can optionally include wherein the interconnect circuitry is configured to couple a first portion of a first circuit block simultaneously with coupling a different portion of a second circuit block.

In Example 9, the subject matter of any one of Examples 1-8 can optionally include wherein at least two chains of the plurality of chains are configured to transmit on a same frequency band.

In Example 10, the subject matter of any one of Examples 1-9 can optionally include fault detection and performance monitoring circuitry to detect a failure condition in at least one circuit block of the plurality of circuit blocks.

Example 11 is an apparatus comprising an interface coupled to at least one circuitry element; and baseband circuitry coupled to the interface and configured to monitor at least one condition of the at least one circuitry element to predict an end-of-life (EOL) point for the at least one circuitry element; and modify at least one operational parameter of the at least one circuitry element based on the least one condition.

In Example 12, the subject matter of Example 11 can optionally include wherein the at least one circuitry element comprises at least a phase locked loop (PLL), and wherein the at least one condition includes at least one of temperature, duty cycle, and oscillator voltage swing.

In Example 13, the subject matter of Example 12 can optionally include wherein the baseband circuitry is configured to increase oscillator voltage swing of the at least one circuitry element responsive to determining that the predicted EOL point is subsequent to a point indicated by a specification for the respective circuitry element.

In Example 14, the subject matter of Example 13 can optionally include wherein the operational parameter comprises a low dropout regulator (LDO) voltage.

In Example 15, the subject matter of Example 12 can optionally include wherein the at least one circuitry element comprises a plurality of circuitry elements, and wherein the baseband circuitry is configured to separately monitor each of the plurality of circuitry elements.

In Example 16, the subject matter of any one of Examples 11-15 can optionally include wherein the baseband circuitry is configured to monitor the at least one condition for a reference interval before modifying the at least one operational parameter.

In Example 17, the subject matter of Example 16 can optionally include wherein the baseband circuitry is configured to set an initial reliability projection based on actual deterioration of the at least one circuitry element during the reference interval relative to an expected deterioration during the reference interval.

Example 18 is a computer-readable medium including instructions that, when executed on processing circuitry, cause a device associated with the processing circuitry to perform operations including: monitoring at least one condition of at least one circuitry element to predict an end-of-life (EOL) point for the at least one circuitry element; and modifying at least one operational parameter of the at least one circuitry element based on the least one condition.

In Example 19, the subject matter of Example 18 can optionally include wherein the at least one circuitry element comprises at least a phase locked loop (PLL), and wherein the at least one condition includes at least one of temperature, duty cycle, and oscillator voltage swing.

In Example 20, the subject matter of Example 19 can optionally include wherein the operations further comprise increasing oscillator voltage swing of the at least one circuitry element responsive to determining that the predicted EOL point is subsequent to a point indicated by a specification for the respective circuitry element.

In Example 21, the subject matter of Example 20 can optionally include wherein the operational parameter comprises a low dropout regulator (LDO) voltage.

In Example 22, the subject matter of any one of Examples 18-21 can optionally include setting an initial reliability projection based on actual deterioration of the at least one circuitry element during a reference interval relative to an expected deterioration during the reference interval.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. An apparatus comprising:
   a plurality of chains of circuitry, the plurality of chains including at least one chain of transmitter circuitry configured to generate output radio frequency (RF) signals using baseband signals and at least one chain of receiver circuitry configured to receive RF signals, at least one of the plurality of chains including a plurality of circuit blocks, a circuit block of the plurality of circuit blocks including at least one of oscillator circuitry, clocking circuitry, and phased lock loop (PLL) circuitry;
   interconnect circuitry configured to simultaneously couple different portions of one of the plurality of circuit blocks to different portions of one or more other circuit blocks of the plurality of circuit blocks in a respective chain of the plurality of chains; and
   baseband circuitry coupled to the interconnect circuitry and configured to monitor at least one condition of at least one circuit block of the plurality of circuit blocks to predict an end-of-life (EOL) point for the at least one circuit block and to increase oscillator voltage swing of the at least one circuit block responsive to determining that the EOL point is subsequent to a point indicated by a specification for the respective circuit block, the baseband circuitry to modify a low dropout regulator (LDO) voltage based on the at least one condition.

2. The apparatus of claim 1, further comprising scheduler circuitry, the scheduler circuitry configured to provide instructions to the interconnect circuitry to couple or uncouple a circuit block of the plurality of circuit blocks based on a condition of a respective one of the plurality of circuit blocks.

3. The apparatus of claim 2, wherein the condition includes an amount of time during which the respective one of the plurality of circuit blocks has been in operation.

4. The apparatus of claim 2, wherein the condition includes temperature.

5. The apparatus of claim 2, wherein the scheduler circuitry is configured to provide instructions to operate the plurality of circuit blocks at varying supply voltages based on a modulation scheme of the respective chain of the plurality of chains.

6. The apparatus of claim 2, wherein the scheduler circuitry is configured to provide instructions to calibrate at least one non-coupled circuit block.

7. The apparatus of claim 2, wherein the scheduler circuitry is configured to provide instructions to operate a circuit block only during low-load conditions of the respective chain of the plurality of chains.

8. The apparatus of claim 1, wherein the interconnect circuitry is configured to couple a first portion of a first circuit block simultaneously with coupling a different portion of a second circuit block.

9. The apparatus of claim 1, wherein at least two chains of the plurality of chains are configured to transmit on a same frequency band.

10. The apparatus of claim 1, further comprising fault detection and performance monitoring circuitry to detect a failure condition in at least one circuit block of the plurality of circuit blocks.

11. An apparatus comprising:
an interface comprising interconnect circuitry coupled to at least one circuitry element; and
baseband circuitry coupled to the interface and configured to:
monitor at least one condition of the at least one circuitry element to predict an end-of-life (EOL) point for the at least one circuitry element; and
modify at least one operational parameter of the at least one circuitry element based on the least one condition,
the interconnect circuitry configured to simultaneously couple different portions of the at least one circuitry element to different portions of at least another circuitry element of the baseband circuitry,
wherein the baseband circuitry is configured to monitor the at least one condition for a reference interval before modifying the at least one operational parameter, and wherein the baseband circuitry is configured to set an initial reliability projection based on actual deterioration of the at least one circuitry element during the reference interval relative to an expected deterioration during the reference interval.

12. The apparatus of claim 11, wherein the at least one circuitry element comprises at least a phase locked loop (PLL), and wherein the at least one condition includes at least one of temperature, duty cycle, and oscillator voltage swing.

13. The apparatus of claim 12, wherein the baseband circuitry is configured to increase oscillator voltage swing of the at least one circuitry element responsive to determining that the EOL point is subsequent to a point indicated by a specification for the respective circuitry element.

14. The apparatus of claim 13, wherein the operational parameter comprises a low dropout regulator (LDO) voltage.

15. The apparatus of claim 12, wherein the at least one circuitry element comprises a plurality of circuitry elements, and wherein the baseband circuitry is configured to separately monitor each of the plurality of circuitry elements.

16. A non-transitory computer-readable medium including instructions that, when executed on processing circuitry, cause a device associated with the processing circuitry to perform operations including: monitoring via interconnect circuitry, at least one condition of at least one circuitry element to predict an end-of-life (EOL) point for the at least one circuitry element; modifying at least one operational parameter of the at least one circuitry element based on the least one condition, the interconnect circuitry configured to simultaneously couple different portions of the at least one circuitry element to different portions of at least another circuitry element of the device; and setting an initial reliability projection based on actual deterioration of the at least one circuitry element during a reference interval relative to an expected deterioration during the reference interval.

17. The non-transitory computer-readable medium of claim 16, wherein the at least one circuitry element comprises at least a phase locked loop (PLL), and wherein the at least one condition includes at least one of temperature, duty cycle, and oscillator voltage swing.

18. The non-transitory computer-readable medium of claim 17, wherein the operations further comprise increasing oscillator voltage swing of the at least one circuitry element responsive to determining that the EOL point is subsequent to a point indicated by a specification for the respective circuitry element.

19. The non-transitory computer-readable medium of claim 18, wherein the operational parameter comprises a low dropout regulator (LDO) voltage.

* * * * *